United States Patent

Kubo et al.

[15] 3,646,836
[45] Mar. 7, 1972

[54] HYDRAULIC CONTROL SYSTEM FOR AUTOMATIC TRANSMISSIONS

[72] Inventors: Seitoku Kubo; Kiyoshi Ohnuma; Koichiro Hirosawa, all of Aichi-ken, Japan

[73] Assignee: Toyota Jidosha Kogyo Kabushiki Kaisha, Toyota-cho, Toyoda-shi, Aichi-ken, Japan

[22] Filed: June 2, 1970

[21] Appl. No.: 42,844

[30] Foreign Application Priority Data

June 5, 1969 Japan..................................44/44182

[52] U.S. Cl................................................74/864, 74/868
[51] Int. Cl..............................................................B60k 21/00
[58] Field of Search..........................74/863–865, 867–869, 74/645

[56] References Cited

UNITED STATES PATENTS 3,103,129   9/1963   Egbert et al. ............................74/864
3,230,791   1/1966   Kelley et al. ............................74/864

*Primary Examiner*—Arthur T. McKeon
*Attorney*—McGlew & Toren

[57] ABSTRACT

A hydraulic control system is provided for a fluid-type automatic transmission of the type including a fluid torque converter and speed change gearing coupled to the converter and operated by hydraulic servomechanisms. The system includes a pressure regulator valve which regulates the pressure of the hydraulic fluid, supplied from a pump or pumps driven by the engine, to a predetermined line pressure applied to the hydraulic servomechanisms. When the engine is operating at a low speed, the line pressure is sharply increased using only the hydraulic pressure fluid from a front oil pump driven by the engine. When the engine speed is increased slightly, the line pressure is maintained at a constant high value by controlling discharge of the hydraulic fluid under pressure to correspond with the supply of hydraulic fluid under pressure through a flow restriction. When the speed of the engine is increased further, the rate of fluid flow through the flow restriction becomes increasingly less than the rate of fluid discharged, so that a hydraulic pressure differential is provided between two regulator valve chambers interconnected by the flow restriction. As a result, the line pressure is gradually decreased. When the speed of the engine is increased even further, the rate of discharge of the fluid is controlled independently of the flow restriction, so that the line pressure is maintained continuously at a constant low value. The relation between the line pressure and the engine speed is made proportional to the opening of an engine throttle valve by applying, to the pressure regulator, the negative pressure of a vacuum pipe connected to the engine.

10 Claims, 5 Drawing Figures

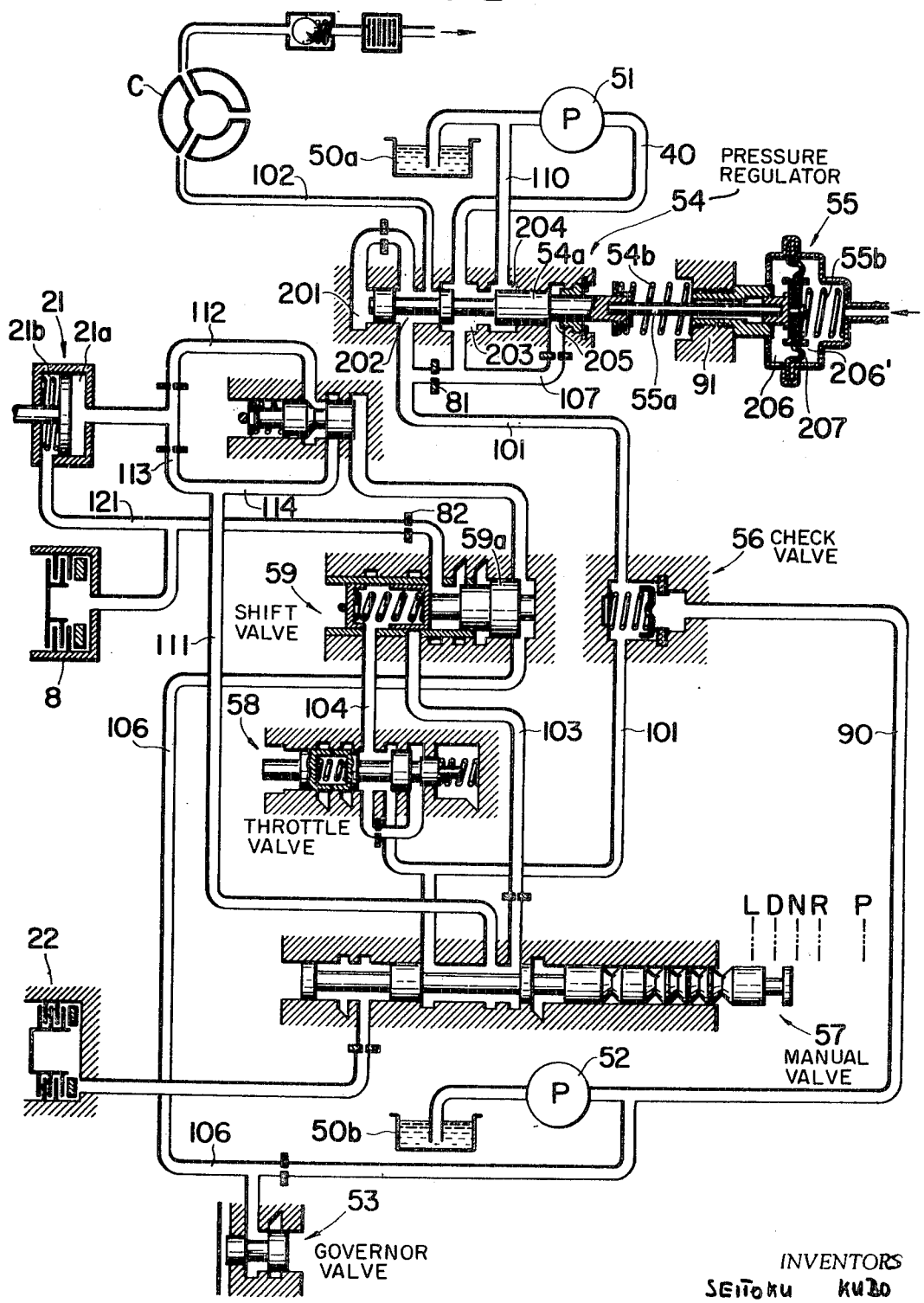

HYDRAULIC CONTROL SYSTEM FOR AUTOMATIC TRANSMISSIONS

SUMMARY OF THE INVENTION

This invention relates to the control of automatic transmissions for automotive vehicles and, more particularly, to a novel and simplified hydraulic control system for a fluid-type automatic transmission.

In accordance with the invention, the "line pressure" supplied to the hydraulic servomechanisms controlling the automatic transmission is controlled at all times to values effectively adapted to the travelling conditions, such as the speed, of the automotive vehicle. For this purpose, the hydraulic control system includes a pressure regulator valve controlling the line pressure to be applied to the servomechanisms. This valve is provided with first and second pressure-regulating chambers, and with a valve body displaceable in these chambers under the influence of biasing means and fluid or hydraulic pressure. The pressure regulator valve is supplied with hydraulic fluid under variable pressure from an engine-driven front pump, and may further be supplied with hydraulic fluid under variable pressure from a rear pump driven by the output shaft of the automatic transmission.

The first regulating chamber, which is supplied with the hydraulic fluid under variable pressure, initially effects line pressure regulation in accordance with displacement of the valve body. The displacement of the valve body controls connection of the first regulating chamber to a hydraulic fluid exhaust port and, when the opening to the exhaust port attains a predetermined magnitude, the second regulating chamber comes into action to regulate the line pressure. The first and second regulating chambers are interconnected by a hydraulic fluid branch passage in which there is a flow restriction. This flow restriction, under preselected conditions of hydraulic fluid flow rate, effects a pressure differential between the first and second regulating chambers, with the pressures in the two chambers opposing each other on the movable valve body. Thereby the displacement position of the pressure regulator valve is shifted in accordance with the pressures acting thereon, and corresponding to the hydraulic pressures in the two regulating chambers. The two chambers thus act conjointly to effect the pressure-regulating action.

Additionally, the line pressure is arranged to be varied in accordance with the negative pressure of a vacuum pipe connected to the engine. This negative pressure is applied to the movable valve body, and is correlated with the opening of an engine throttle valve.

An object of the invention is to provide an improved and simplified hydraulic-controlled system for the line pressure effective on hydraulic servomechanisms controlling operation of a fluid-type automatic transmission.

Another object of the invention is to provide such a hydraulic control system including a novel pressure regulator valve operating in a novel manner to control the line pressure in accordance with driving conditions of the vehicle.

A further object of the invention is to provide such a hydraulic control system in which the line pressure is controlled in accordance with the opening of an engine throttle valve.

For an understanding of the principles of the invention, reference is made to the following description of typical embodiments thereof as illustrated in the accompanying drawings.

BRIEF DESCRIPTION OF THE DRAWINGS

In the drawings:

FIG. 2 is an overall circuit diagram of one embodiment of hydraulic control system, in accordance with the invention, illustrating a pressure regulator valve in one operating position;

DESCRIPTION OF THE PREFERRED EMBODIMENTS

Figure 1:
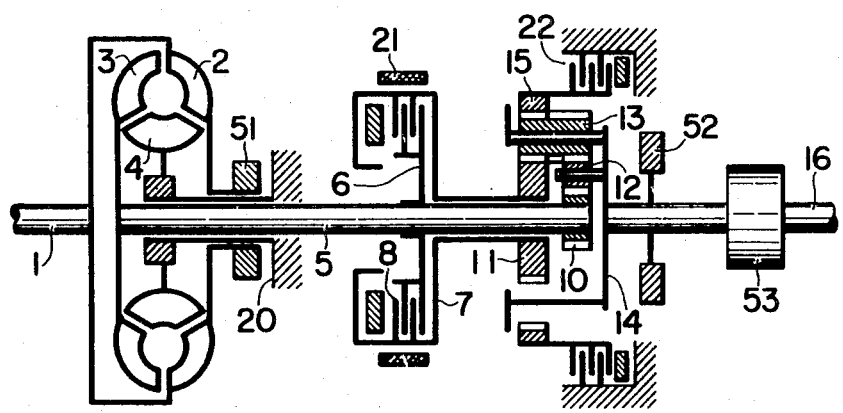
FIG. 1 is a somewhat schematic part sectional view illustrating an automatic transmission having two forward speeds and one reverse speed, and to which the hydraulic control system of the present invention is applied.

Referring first ro FIG. 1, a fluid-type torque converter is illustrated as comprising a pump impeller 2, a turbine runner 3 and a stator 4. Pump impeller 2 is directly coupled to an engine crankshaft 1, and the engine power is transmitted from pump impeller 2 to turbine runner 3 through hydraulic fluid, such as oil, with the oil returning through pump impeller 2 to stator 4. Thereby, the torque of the engine is transmitted to a turbine shaft 5, and the torque of turbine shaft 5 is transmitted to a speed change gear assembled at the rear of the torque converter.

Turbine shaft 5, which is connected to turbine runner 3, serves as an input shaft for the planetary gear speed change means. A hub 6, of a clutch 8, and an input sun gear 10 are connected to rotate with turbine shaft 5. A "low" sun gear 11 is secured to a clutch drum having a disc 7 and forming, with hub 6, a multiple disc clutch 8. Intermeshing pinions 12 and 13 are rotatably supported by a carrier 14 which is secured, to form a single unit, with an output shaft 16. Pinions 12 mesh with input sun gear 10, and pinions 13 not only mesh with pinions 12 but also mesh with "low" sun gear 11 and an internal ring gear 15.

A front brake band 21 is provided in operative relation with the outer periphery of the clutch drum, for clamping the clutch drum against rotation. A clutch-type rear brake mechanism 22 is interposed between the outer periphery of internal ring gear 15 and the casing or housing of the speed change gear. A governor valve unit 53 is provided on output shaft 16. A front oil pump 51 is driven directly by the engine, through impeller 2, and a rear oil pump 52 is driven by output shaft 16.

The arrangement shown in FIG. 1 provides two forward speeds and one reverse speed, in a manner which will now be described. In first or low speed, the angular velocity of turbine shaft 5, as transmitted to the output shaft 16, is decreased or reduced by applying front brake band 21 to hold clutch drum 7 and low sun gear 11, forming a unit with clutch drum 7, stationary. The reduced angular velocity thus transmitted to output shaft 16 results in the output shaft rotating at a first or low speed.

To shift into a higher or second speed, the drive from turbine shaft 5 to output shaft 16 is converted into a direct drive by engaging clutch 8 so that the entire planetary gearing rotates as a single unit, whereby shaft 16 is rotated at the same angular velocity as shaft 5.

For reverse speed, clutch 22 of the rear brake mechanism is engaged, to hold ring gear 15 stationary and thus reverse the direction of rotation of carrier 14. The reversed and reduced angular velocity of carrier 14 is transmitted to output shaft 16 so that the vehicle is operated in reverse.

From the foregoing, it will be noted that the torque of turbine shaft 5 is transmitted to the speed change gear mechanism at the rear of the torque converter, and the clutch mechanism 8 and brake mechanisms 21 and 22 are controlled by hydraulic servomechanisms operated by hydraulic fluid pressure, to provide for shifting between the two forward speeds and the reverse speed, by appropriate control of the planetary gear unit. The present invention is directed to a hydraulic pressure control circuit which controls the servo hydraulic pressure actuating clutch mechanism 8 and brake mechanism 21 and 22.

Figure 3:
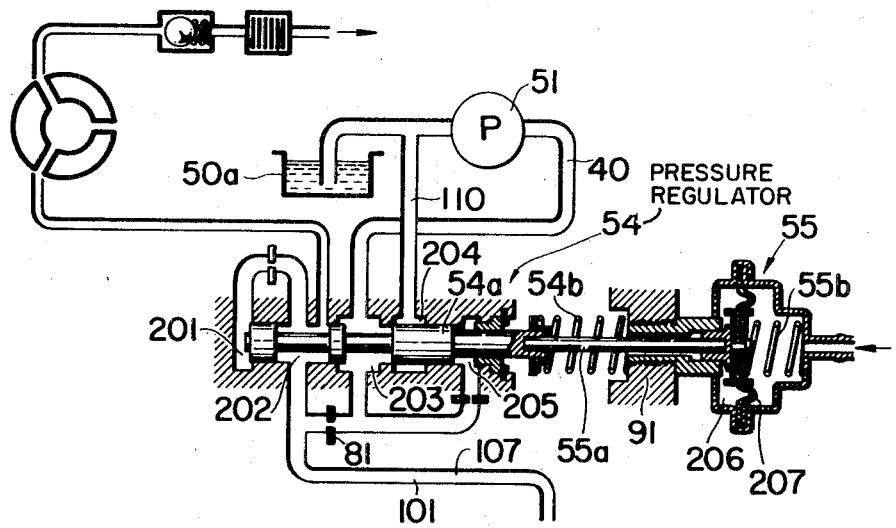
FIG. 3 is a partial circuit diagram, corresponding to FIG. 2, and illustrating the pressure regulator valve in another operating condition.

Referring to FIGS. 2 and 3, which illustrate one embodiment of the hydraulic pressure control circuit, front oil pump 51, driven directly by the engine through pump impeller 2, draws oil from a reservoir 50a and supplies oil under pressure to an oil chamber 203 of a pressure regulator valve 54, through a flow circuit or passage 40. Rear oil pump 52, driven by output shaft 16, draws oil from a reservoir 50b and supplies it, under pressure, to a line pressure circuit or passage 101 through a check valve 56, and then to an oil chamber 202 of pressure regulator valve 54. The hydraulic pressure supplied from front and rear oil pumps 51 and 52, respectively, is controlled by means of pressure regulator valve 54 and applied to passage 101.

The line pressure $P_L$ of passage 101 is applied to a throttle valve 58 and to a manually operable valve 57. When valve 57 is in the "D" position, namely, in the drive range, the hydraulic pressure is transmitted to circuits or passages 103 and 111. The opening of an engine throttle valve is detected as the displacement of a piston, and a hydraulic pressure, proportional to this displacement, is developed in a passage 104. This hydraulic pressure is referred hereinafter as the throttle pressure Pth. Conversely, the vehicle speed is detected by governor 53 driven by output shaft 16, and a hydraulic pressure corresponding to the vehicle speed is applied to circuit or passage 106 as the governor pressure Pgo. The reduction ratio of the planetary gear unit is changed by means of a shift or speed change valve 59 to which is applied the throttle pressure Pth and the governor pressure Pgo, in opposition to each other. That is, in the "D" range of manual valve 57, line pressure $P_L$ is supplied also to hydraulic circuit or passage 111 which connects manual valve 57 and front brake band 21. Thus, the hydraulic pressure is applied to a servo piston pressure side 21a of brake band 21. If the pressure in passage or circuit 121 is zero, brake band 21 is applied and front clutch 8 is released, thus resulting in the transmission being shifted to the first speed.

When a vehicle speed conforming to the opening of the throttle valve is reached, shift valve 59 is actuated by governor pressure Pgo and moves to the left, thus interconnecting hydraulic passages 103 and 121. At this time, the line pressure is effective on both front clutch 8 and the release side 21b of a servo piston, so that brake band 21 is released and the front clutch 8 is engaged. Consequently, the planetary gear system rotates as a single unit and turbine shaft 5 directly drives output shaft 16 so that the second or higher speed is obtained. The shift from direct drive to the first or lower speed is effected by discharging the hydraulic pressure in passage 121 through shift valve 59.

Figure 5:
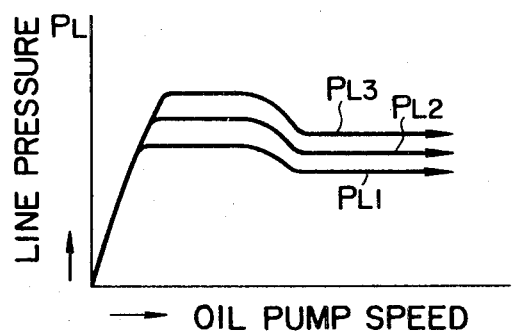
FIG. 5 is a graphic illustration of the variation in line pressure in accordance with pump speed and throttle valve opening.
Figure 4:
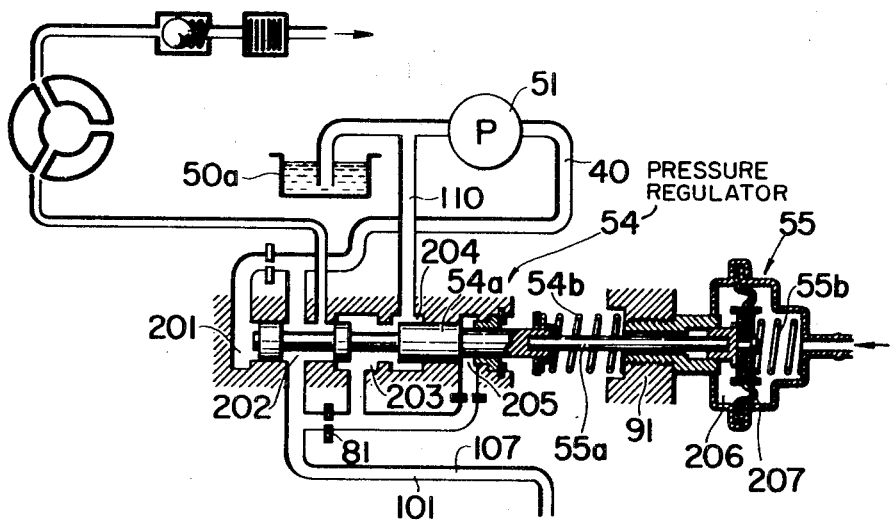
FIG. 4 is a partial circuit diagram, similar to FIG. 3, illustrating another embodiment of the invention

Regulation of the line pressure $P_L$ applied to the servomechanisms for operating the brakes and clutches, is effected by means of pressure regulator valve 54. The characteristics of the hydraulic line pressure $P_L$ as regulated by the hydraulic pressure control circuit shown in FIGS. 2 and 4, are illustrated in FIG. 5. Referring to FIG. 5, line pressure $P_L$ is abruptly increased as the oil pump speed increases, and then slowly decreases after having been maintained at a constant value. After the oil pump speed has decreased to a certain low value, the line pressure is maintained at a specified constant low value. The change in the line pressure $P_L$ varies with the opening of the engine throttle valve. When the throttle valve is fully closed, the line pressure is changed as indicated by the lowest curve $P_{L1}$ and is increased as the opening of the engine throttle valve is gradually increased. The center curve $P_{L2}$ indicates the change in the line pressure when the engine throttle valve is half opened, and the upper curve $P_{L3}$ indicates the change in the line pressure when the throttle valve is fully opened.

As mentioned above, in accordance with the invention the line pressure $P_L$, which serves as the pressure for operating the hydraulic servo devices, undergoes appropriate changes in accordance with the travel of the vehicle and, in particular, it is changed in proportion to the opening of the engine throttle valve. Moreover, the line pressure is gradually decreased when the speed of the engine is increased to a certain level, and is maintained at a constant low value when the engine is operating at a higher speed. The reason why this desirable hydraulic pressure change is required will be apparent from the following. The pressure required by the hydraulic servomechanism varies with the engine output torque and the travelling condition of the vehicle. Too low a pressure causes slipping of the clutch or brake band, so that travelling of the vehicle becomes impossible. Too high a pressure gives an unpleasant feeling to a driver, by producing shocks or noise at the time of shifting of gears, or results in an increase in the power loss of the pump. Therefore, it is necessary to change the line pressure supplied to the hydraulic servomechanisms in an appropriate fashion as occasion demands. The engine output torque is nearly proportional to the opening of the engine throttle valve, but inversely proportional to the speed of the engine. Since a high effective force of the servomechanisms is required in the range where the engine speed is relatively low, or the vehicle speed is low, as at the time of starting, the above-described change in the line pressure is desirable.

In the present invention, control of the hydraulic pressure supplied to the hydraulic servomechanisms is effected by utilizing the discharge from oil pumps in a manner to obtain the above-mentioned characteristic curves of the line pressure. One form of pressure regulator valve 54, constituting the primary object of the present invention, will now be described with reference to FIGS. 2 and 3. As mentioned, pressure regulator valve 54 is designed to control the line pressure supplied to the clutch mechanism 8 and the servo chambers of brake mechanisms 21 and 22. Five oil or hydraulic fluid chambers are provided in regulator valve 54, as indicated at 201, 202, 203, 204 and 205. Chamber 201 is connected with chamber 202 by a flow passage connected with line pressure passage 101. When valve body 54a of pressure regulator valve 54 is in the right-hand position, shown in FIG. 2, chamber 202 is also connected with a passage 102 leading to torque converter C. Chamber 203 is connected with chamber 205 by a flow passage 107, and is also connected to the output of front oil pump 51 by a supply passage 40. Chamber 202 is connected with chamber 203 by the interconnection between passages 101 and 107 and, in the interconnection between chambers 202 and 203, circuit resistance is provided by means of an orifice 81. Chamber 204 has an exhaust port connected, through an exhaust or discharge passage, to reservoir 50a.

As valve body 54a is moved from the left-hand position, shown in FIG 3, to the right, chamber 204 is brought into connection with chamber 203, and the pressure in chamber 203 is thus relieved through the exhaust port. Then chamber 202 is brought into connection with chamber 203, and the pressure in chamber 202 is relieved through chambers 203 and 204. Since chamber 203 is first connected to the exhaust port, as mentioned above, this chamber will be termed the "first regulating chamber" and, as chamber 202 is connected to the exhaust port after connection of chamber 203 thereto, chamber 202 will be designated the "second regulating chamber."

A diaphragm mechanism 55 is provided at the right end of pressure regulator valve 54 and includes a right-hand chamber 206' and a left-hand chamber 206 which are sealed from each other by a diaphragm 207, with a coil spring 55b being located in right-hand chamber 206'. Spring 55b functions to constantly apply a bias moving diaphragm 207 to the left, and has applied thereto the negative pressure of the engine vacuum pipe. This negative pressure acts to attract diaphragm 207 to the right, at all times, in order to oppose the leftward bias of coil spring 55b. Thus, the effective bias of spring 55b is reduced by an amount corresponding to the negative pressure of the vacuum pipe, and it is this effective bias which is applied to diaphragm 207. The net bias is arranged to act on valve body 54a of pressure regulator valve 54 as a working force directed to the left, through the medium of a rod 55a connecting diaphragm mechanism 55 with valve body 54a. A second coil spring 54b is provided between the right end of valve body 54a and a fixed portion 91 of the pressure regulator valve. Spring 54b also serves to apply a leftward-acting bias to valve body 54a.

The hydraulic pressures in chambers 201 and 205 are effective on valve body 54a, in the respective chambers, and the two hydraulic pressures act in opposition on valve body 54a. More specifically, the pressure in chamber 201 acts to move valve body 54a to the right, while the pressure in chamber 205 acts to move valve body 54a to the left. Chamber 201 is connected with the second regulating chamber 202 by a flow passage, and a chamber 205 is connected with the first regulating chamber 203 by a flow passage. Since the pressures in chambers 201 and 205, respectively, are identical with those in regulating chambers 202 and 203, to which they are connected by respective flow passages, valve body 54a is acted upon by the hydraulic pressures in the first and second regulating chambers 203 and 202, respectively, and these hydraulic pressures act in opposition to each other. Since the bias of springs 54b and 55b, acting on valve body 54a, are constant, if the negative pressure of the vacuum pipe is constant, valve body 54a of valve 54 is controlled, as to the effective force thereon, by the difference in pressure between first regulating chamber 203 and second regulating chamber 202.

The operation of the hydraulic pressure control circuit including pressure regulator valve 54, in accordance with the speed of the oil pumps, will now be described. For convenience, the description will be given first with respect to the condition where the engine throttle valve is fully opened and the negative pressure of the vacuum pipe is at its minimum. In this connection, it should be further noted that the opening of the engine throttle valve is nearly inversely proportional to the negative pressure of the vacuum pipe.

Under the stated conditions, if the engine speed is small and the angular velocity of pumps 51 and 52 is also small, the hydraulic pressure discharged from rear pump 52 is blocked by check valve 56, because the capacity of front pump 51 is greater than that of rear pump 52. Therefore, only the hydraulic pressure developed by front pump 51 is applied to pressure regulator valve 54. The pressure of front pump 51 is supplied into first regulating chamber 203 of valve 54 through flow passage 40. When the resultant pressure is insufficient, valve body 54a is in the left position shown in FIG. 3, in which it is held by the effective bias of springs 54b and 55b, so that first and second regulating chambers 203 and 202 are blocked from direct interconnection and from connection to the exhaust port of chamber 204.

Consequently, the effective pressure from front pump 51 passes from chamber 203 through passage 107 and orifice 81, and serves as the line pressure $P_L$ in passage 101. Since front pump 51 has a high capacity, the line pressure $P_L$ is now indicated by the abruptly rising line shown in FIG. 5 in the low speed range of the pump. When line pressure $P_L$ is considerably increased, under the stated condition, the discharge pressure from rear pump 52 is supplied from passage 90 through check valve 56 into passage 101 to serve as the line pressure $P_L$.

When the line pressure $P_L$ has increased as mentioned, and has reached the predetermined high value, a force acting to the right is effective on valve body 54a by the difference in the effective pressure-receiving areas of valve body 54a in chamber 201 and in chamber 205, because the pressure in chamber 201 is equal to that in chamber 205. More specifically, if the pressure-receiving area of valve body 54a in chamber 201 is represented by 201A, that of the valve body in chamber 205 by 205A, and the difference between these areas obtained by subtracting 205A from 201A (because 201A is larger than 205A) by A', the above-mentioned working force, acting to the right on valve body 54a, is represented by the hydraulic pressure acting on the area A'. When this force increases to a value sufficient to overcome the force acting to the left, developed by coil springs 54b and 55b, valve body 54a moves to the right and thereby first regulating chamber 203 and chamber 204, connected to the exhaust line 110, are interconnected. Thus, the pressure in first regulating chamber 203 is relieved into chamber 204, at a controlled rate, to maintain line pressure $P_L$ at a predetermined constant value. This control of line pressure $P_L$ continues as long as the flow from passage 101 to first regulating chamber 203 through orifice 81 is able to remain equal with the discharge from first regulating chamber 203 into chamber 204. This condition can be selected by appropriate design of the passage resistance in orifice 81.

When the pump speed is increased so that its discharge pressure increases with respect to the condition just described, the opening between first regulating chamber 203 and chamber 204 is increased to continue to maintain the line pressure at the constant value. Therefore, the flow through orifice 81 can no longer be maintained equal to the discharge from chamber 203. As a result, there is developed a difference between the hydraulic pressure in the first regulating chamber 203 and that in second regulating chamber 202, and the pressure in chamber 203 is decreased. Since the effective force of springs 54b and 55b is nearly constant, the pressure in chamber 201 is decreased to balance the forces acting on valve body 54a. This pressure difference gradually increases as the discharge of the pump is increased. Since the pressure difference is inversely proportional to the pressure in chamber 201, the pressure in chamber 201 gradually decreases as the discharge or speed of the pump is increased. If the pump discharge is increased further, second regulating chamber 202 and first regulating chamber 203 are brought into direct connection with each other, so that the pressure in chamber 201 is available as the line pressure $P_L$ in passage 101. This condition is shown by the rightwardly declining line in FIG 5.

When first and second regulating chambers 202 and 203, respectively, are interconnected as mentioned, substantially all the pressure in chamber 203 is released into chamber 204, so that the pressure in chamber 203 approaches zero. Thus, only the pressure in chamber 201 acts as the working force biasing valve body 54a to the right, and opposing the effective force of springs 54b and 55b tending to move valve body 54a to the left. The pressure in second regulating chamber 202 is released into chamber 204 through first regulating chamber 203, at a controlled rate.

The hydraulic pressure in chamber 201 is controlled to the value necessary to oppose the force acting to move valve body 54a to the left, and is applied to passage 101 as a constant low line pressure $P_L$. The control of this pressure is effected continuously to maintain the line pressure $P_L$ at a constant low value as long as the speed of rear pump 52 is being gradually increased and the outlet pressure thereof is applied to passage 101 through check valve 56. Since the hydraulic control system operates in the above manner, there are obtained the curves shown in FIG. 5. Moreover, since the foregoing description is based on the condition that the engine throttle valve is fully opened and the negative pressure of the vacuum pipe is small, the line pressure curve is indicated at $P_{L3}$ in FIG. 5.

When the engine throttle valve opening is gradually decreased, the negative pressure of the vacuum pipe is correspondingly increased. As a result, the effective bias of spring 55b of diaphragm mechanism 55 is correspondingly decreased, and the force acting to move valve body 54a to the left is also decreased. Consequently, the regulating action of valve body 54a can be effected by a smaller force acting to the right thereon. Thus, the pressures in the first and second regulating chambers 203 and 202 become gradually lower, and thus the line pressure $P_L$, as applied to passage 101, is gradually lowered. As shown in FIG. 5, the curve of the line pressure changes under the conditions where the engine throttle valve is half opened and when it is fully closed are indicated by the lines $P_{L2}$ and $P_{L1}$, respectively, which are representative of lower values than those represented by the line $P_{L3}$ obtained when the throttle valve is fully opened.

In the embodiment of the invention shown in FIGS. 2 and 3, the oil pressure is supplied by both a front pump 51, driven by the engine, and a rear pump 52, driven by output shaft 16. Recently, however, there is a tendency to provide only the front pump, for various reasons. An arrangement using only the front pump 51 is illustrated in FIG. 4, and the description of FIG. 4 will be limited to only those features which differ from the embodiment of the invention shown in FIGS. 2 and 3.

Referring to FIG 4, the pressure supply line 40 of front pump 51 is connected with the second regulating chamber 202, instead of being connected with the first regulating chamber 203 as in the embodiment of the invention shown in FIGS. 2 and 3. Thus, when the pump speed is increased, hydraulic pressure control is effected by the hydraulic fluid under pressure supplied from front pump 51, instead of being effected by the hydraulic fluid under pressure discharged from rear pump 52, as in the embodiment of FIGS. 2 and 3. Nevertheless, the pressure control action is the same as previously described.

It should be noted that, even in the embodiment of the invention shown in FIGS. 2 and 3, the hydraulic fluid under pressure supplied through line 40 from front pump 51 can be connected with the second regulating chamber 202. In such case, however, there will be a loss in pressure of the front pump. For the purpose of facilitating understanding, the same reference characters have been used, in FIG. 4, to indicate those parts which are identical with the parts shown in FIGS. 2 and 3.

From the foregoing description, it will be clear that a desirable line pressure curve, as shown in FIG. 5, to be applied to the hydraulic servomechanisms of a fluid-type automatic transmission can be obtained so that automatic speed change is effected under the most favorable conditions. In addition, the present invention has the following advantages:

1. Other signals, such as vehicle speed, r.p.m. of an engine, etc., can be detected by detecting the discharge of hydraulic fluid under pressure from a pump which is primarily designed to develop hydraulic pressure, and therefore no special mechanisms for detecting vehicle speed, engine r.p.m., etc., are required. This is very advantageous in simplifying the construction, reducing the cost, and decreasing the size of the control system.

2. A line pressure changeable with the changes in the pump speed can be obtained easily by a control system wherein the hydraulic line pressure is changed in accordance with the change in the pressure in the regulating chambers, by shifting the control position of a pressure regulator valve by means of pressure obtained by converting a pump discharge to a pressure change by means of a flow-restricting orifice.

The invention has been described as applied to an automotive vehicle transmission having two forward speeds and one reverse speed. However, it should be understood that the principles of the invention are applicable equally to automatic transmissions having more than two forward speeds and more than one reverse speed.

While the specific embodiments of the invention have been shown and described in detail to illustrate the application of the principles of the invention, it will be understood that the invention may be embodied otherwise without departing from such principles.

What is claimed is:

1. In a fluid-type automatic transmission for automotive vehicles, including a fluid torque converter driven by an engine and speed change gearing coupled to the torque converter and operated by hydraulic servomechanisms, a hydraulic control system, for the line pressure supplied to the servomechanisms, comprising, in combination, fluid pressure generating means supplying hydraulic fluid under variable pressure; a pressure regulator valve connected to said generating means and controlling the line pressure supplied to said servomechanisms; said pressure regulator valve being formed with first and second regulating chambers subjected to hydraulic fluid under variable pressure, and including a valve body displaceable in said chambers under the influence of biasing means and fluid pressure; a line pressure passage connected to said second regulating chamber, a branch passage connecting said line pressure chamber to said first regulating chamber; and a flow restriction in said branch passage; said flow restriction restricting flow of fluid from said line passage to said first regulating chamber; said valve body being subjected initially to the pressure in said first regulating chamber and controlling connection of said first regulating chamber to an exhaust port to regulate the line pressure by varying the flow of fluid to the exhaust port in correspondence with the pressure of said pressure-generating means; the pressures in said first and second regulating chambers acting in opposition on said valve body; the pressure in said first regulating chamber, upon a predetermined opening of the latter to the exhaust port, decreasing, due to said flow restriction, to a value sufficiently less than that of the pressure in said second regulating chamber, that said valve body is shifted to an extent connecting said second regulating chamber to the exhaust port through said first regulating chamber; whereby said valve body then is subjected to the opposing pressures in said first and second regulating chambers in regulating the line pressure.

2. A hydraulic control system, as claimed in claim 1, in which said engine has a vacuum pipe; and means subjecting said valve body to the negative pressure of said vacuum pipe.

3. A hydraulic control system, as claimed in claim 1, in which said fluid pressure generating means comprises an engine-driven front pump having its output connected to said first regulating chamber.

4. A hydraulic control system, as claimed in claim 3, in which said fluid pressure generating means includes a transmission-driven rear pump having its output connected to said line pressure passage.

5. A hydraulic control system, as claimed in claim 4, including a check valve interposed between the output of said rear pump and said line pressure passage.

6. A hydraulic control system, as claimed in claim 1, in which said fluid pressure generating means includes an engine-driven front pump having its output connected to said second regulating chamber.

7. A hydraulic control system, as claimed in claim 1, including a third chamber of said pressure regulator valve adjacent said second regulating chamber; a flow passage connecting said third chamber to said second regulating chamber; said biasing means acting to move said valve body in opposition to the pressure in said third chamber.

8. A hydraulic control system, as claimed in claim 7, in which said pressure regulator valve includes a fourth chamber adjacent said first regulating chamber and having an exhaust port for discharge of hydraulic fluid; said valve body having first land means normally blocking communication between said first regulating chamber and said fourth chamber, and having second land means normally blocking direct communication between said first and second regulating chambers.

9. A hydraulic control system, as claimed in claim 8, in which said valve body has third land means blocking direct communication between said third chamber and said second regulating chamber.

10. A hydraulic control system, as claimed in claim 9, in which said pressure regulator valve includes a fifth chamber in communication with said first regulating chamber and on the opposite side of said first land means from said fourth chamber.

* * * * *